United States Patent
Zait et al.

(10) Patent No.: US 10,659,278 B2
(45) Date of Patent: May 19, 2020

(54) VIDEO INTERCONNECT SYSTEM

(71) Applicant: T-Mobile USA, Inc., Bellevue, WA (US)

(72) Inventors: Hichem Zait, Sammamish, WA (US); Nassereddine Sabeur, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/621,373

(22) Filed: Jun. 13, 2017

(65) Prior Publication Data
US 2017/0373913 A1 Dec. 28, 2017

Related U.S. Application Data

(60) Provisional application No. 62/354,632, filed on Jun. 24, 2016, provisional application No. 62/354,660, filed on Jun. 24, 2016.

(51) Int. Cl.
*H04L 29/06* (2006.01)
*H04L 1/00* (2006.01)
(Continued)

(52) U.S. Cl.
CPC ............ *H04L 29/06* (2013.01); *H04L 1/0002* (2013.01); *H04L 43/08* (2013.01);
(Continued)

(58) Field of Classification Search
CPC ....... H04L 29/06; H04L 1/0002; H04L 43/08; H04L 43/0876; H04L 65/1069;
(Continued)

(56) References Cited

U.S. PATENT DOCUMENTS 6,898,427 B1 * 5/2005 Griffith .................... H04Q 7/20
8,631,472 B1 * 1/2014 Martin .................... G06F 15/16
(Continued)

OTHER PUBLICATIONS

Ericsson White Paper, "Voice and videocalling over LTE," pp. 1-18, Nov. 2014 (https://ericsson.com/assets/local/publications/white-papers/wp-voice-and-video-calling-over-lte.pdf) See pp. 8-9.
(Continued)

*Primary Examiner* — Ronald B Abelson
(74) *Attorney, Agent, or Firm* — Han Santos, PLLC

(57) ABSTRACT

This disclosure describes a video interconnect system that may establish a Video over Long Term Evolution (ViLTE) communication session between two interacting client devices. In some examples, the video interconnect system may selectively establish a ViLTE communication based on one or more rules associated with the domain information of interacting client devices, availability of network bandwidth, bandwidth consumption of a video component of the ViLTE communication, or established service agreements between telecommunication service providers of the interacting client devices. Further, the video interconnect system may facilitate generating termination charges for a video and/or audio communication session of a ViLTE communication. For example, a video component of the ViLTE communication may be charged and metered based on data usage, and an audio component of the ViLTE communication may be charged and metered based on the duration and relative location of the interacting client devices.

19 Claims, 6 Drawing Sheets

(51) Int. Cl.

| | | |
|---|---|---|
| *H04L 12/26* | (2006.01) | |
| *H04L 29/08* | (2006.01) | |
| *H04W 28/02* | (2009.01) | |
| *H04M 15/00* | (2006.01) | |
| *H04W 4/24* | (2018.01) | |
| *H04M 15/08* | (2006.01) | |
| *H04N 21/234* | (2011.01) | |
| *H04L 12/811* | (2013.01) | |

(52) U.S. Cl.
CPC ...... *H04L 43/0876* (2013.01); *H04L 65/1016* (2013.01); *H04L 65/1069* (2013.01); *H04L 65/1083* (2013.01); *H04L 65/80* (2013.01); *H04L 67/141* (2013.01); *H04M 15/08* (2013.01); *H04M 15/41* (2013.01); *H04M 15/50* (2013.01); *H04M 15/56* (2013.01); *H04M 15/8033* (2013.01); *H04M 15/8214* (2013.01); *H04M 15/8228* (2013.01); *H04N 21/23418* (2013.01); *H04W 4/24* (2013.01); *H04W 28/0268* (2013.01); *H04L 1/0014* (2013.01); *H04L 47/38* (2013.01); *H04W 28/0226* (2013.01)

(58) Field of Classification Search
CPC ..... H04L 65/108; H04L 65/80; H04L 67/141; H04W 28/0268
See application file for complete search history.

(56) References Cited

U.S. PATENT DOCUMENTS

| | | | |
|---|---|---|---|
| 9,654,964 B1* | 5/2017 | Carames | H04W 8/06 |
| 9,832,797 B2 | 11/2017 | Wang et al. | |
| 9,949,146 B1 | 4/2018 | Velusamy et al. | |
| 2002/0126708 A1 | 9/2002 | Skog et al. | |
| 2006/0256779 A1* | 11/2006 | Lim | H04L 12/66 |
| 2008/0192108 A1 | 8/2008 | Pelous et al. | |
| 2008/0298294 A1* | 12/2008 | Gonsa | H04H 20/71 |
| 2009/0097398 A1* | 4/2009 | Belinchon Vergara | H04L 12/24 |
| 2010/0211686 A1* | 8/2010 | Poikselka | G06F 15/16 |
| 2011/0078281 A1* | 3/2011 | Imbimbo | 709/217 |
| 2012/0314632 A1* | 12/2012 | Cruz | H04W 72/00 |
| 2013/0042276 A1* | 2/2013 | Payette | H04N 7/16 |
| 2014/0064156 A1 | 3/2014 | Paladugu et al. | |
| 2014/0185526 A1 | 7/2014 | Aksu et al. | |
| 2014/0233558 A1 | 8/2014 | Francis | |
| 2014/0280830 A1 | 9/2014 | Ang et al. | |
| 2014/0286438 A1* | 9/2014 | Apte | H04N 7/26 |
| 2015/0117320 A1 | 4/2015 | Wang et al. | |
| 2015/0131526 A1 | 5/2015 | Noldus et al. | |
| 2015/0189097 A1 | 7/2015 | Sharma et al. | |
| 2016/0021151 A1 | 1/2016 | Bain et al. | |
| 2016/0021336 A1 | 1/2016 | Abbott et al. | |
| 2016/0057231 A1* | 2/2016 | Parikh | H04L 67/14 |
| 2016/0073299 A1 | 3/2016 | Liang et al. | |
| 2016/0073317 A1 | 3/2016 | Khay-Ibbat et al. | |
| 2016/0119384 A1 | 4/2016 | Karimli et al. | |
| 2016/0156479 A1* | 6/2016 | Baek | H04L 12/1407 |
| 2016/0345237 A1 | 11/2016 | Jain et al. | |
| 2017/0085720 A1 | 3/2017 | Langarica et al. | |
| 2017/0086066 A1 | 3/2017 | Mohajeri | |
| 2017/0163656 A1* | 6/2017 | Horton | H04L 63/107 |
| 2017/0332240 A1 | 11/2017 | Raleigh | |
| 2017/0366678 A1 | 12/2017 | Anand | |

OTHER PUBLICATIONS

GSM Association, "IMS Profile for Conversational Video Service," Version 11.0, pp. 1-22, May 24, 2016 (https://gsma.com/newsroom/wp-content/uploads/IR.04-v11.0.pdf) See p. 19.
International Search Report and Written Opinion dated Oct. 23, 2017 for PCT Application No. PCT/US2017/038868, 8 pages.
International Search Report and Written Opinion dated Oct. 23, 2017 for PCT Application No. PCT/US2017/038869, 12 pages.
Non-Final Office Action for U.S. Appl. No. 15/621,426 dated Jun. 1, 2018, 39 pages.

\* cited by examiner

VIDEO INTERCONNECT SYSTEM

RELATED APPLICATIONS

This application claims priority to a commonly owned U.S. Provisional Patent Application No. 62/354,632 filed on Jun. 24, 2016, and titled "Video Interconnect Termination Charging," U.S. Provisional Patent Application No. 62/354,660 filed on Jun. 24, 2016, and titled "Video Interconnect Control," which are herein incorporated by reference in their entirety.

BACKGROUND

Mobile telecommunication devices have evolved from simply providing two-way audio communications devices at different locations, to facilitating data transmission of multimedia messages, including real-time video communication sessions between interacting devices. Long-Term Evolution (LTE) is a standard for wireless communication of high-speed data for mobile telecommunications devices. The evolution of LTE has led to the development of Voice over LTE (VoLTE), in which two-way voice communication is delivered via data transmission using LTE instead of a circuited-switched voice network. More recently, further evolution of LTE has led to Video over LTE (ViLTE) communication, which is a person-to-person video service that leverages the same control protocols and data transmission backbone as VoLTE. ViLTE technology enables users to make ViLTE communications, i.e. phone calls that provide both audio and video communication, using their mobile telecommunication devices.

VoLTE are generally permitted between client devices of interacting service providers since these calls generally consume a low amount of data bandwidth. However, unlike a VoLTE communication, a ViLTE communication may generate a significant amount of data and consume a considerable amount of bandwidth. As the usage of ViLTE communications becomes more prevalent, telecommunications service providers are faced with the problem of selectively allowing or blocking a ViLTE communications based on network bandwidth constraints, and/or an availability of service agreements with interacting telecommunications service providers.

Further, telecommunication services providers are faced with an additional problem of being unable to apply a separate, second charge for the audio component of a ViLTE communication. For example, the video component of a ViLTE is charged and metered as data, and a termination charge for the video component may be based on data usage during the ViLTE communication. However, currently charging data records associated with ViLTE do not include information about the origination and destination of the ViLTE communication. As a result, a ViLTE between persons in Japan and the United States, may be charged a similar charge for an audio component, as a similar ViLTE between two persons in a same State of the United States, provided the call duration is substantially equivalent. In other words, even though a first charge may be applied for the video component of a ViLTE based on metered data usage, a second charge for the audio component of the ViLTE cannot be established without first establishing the origination and destination of the ViLTE.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
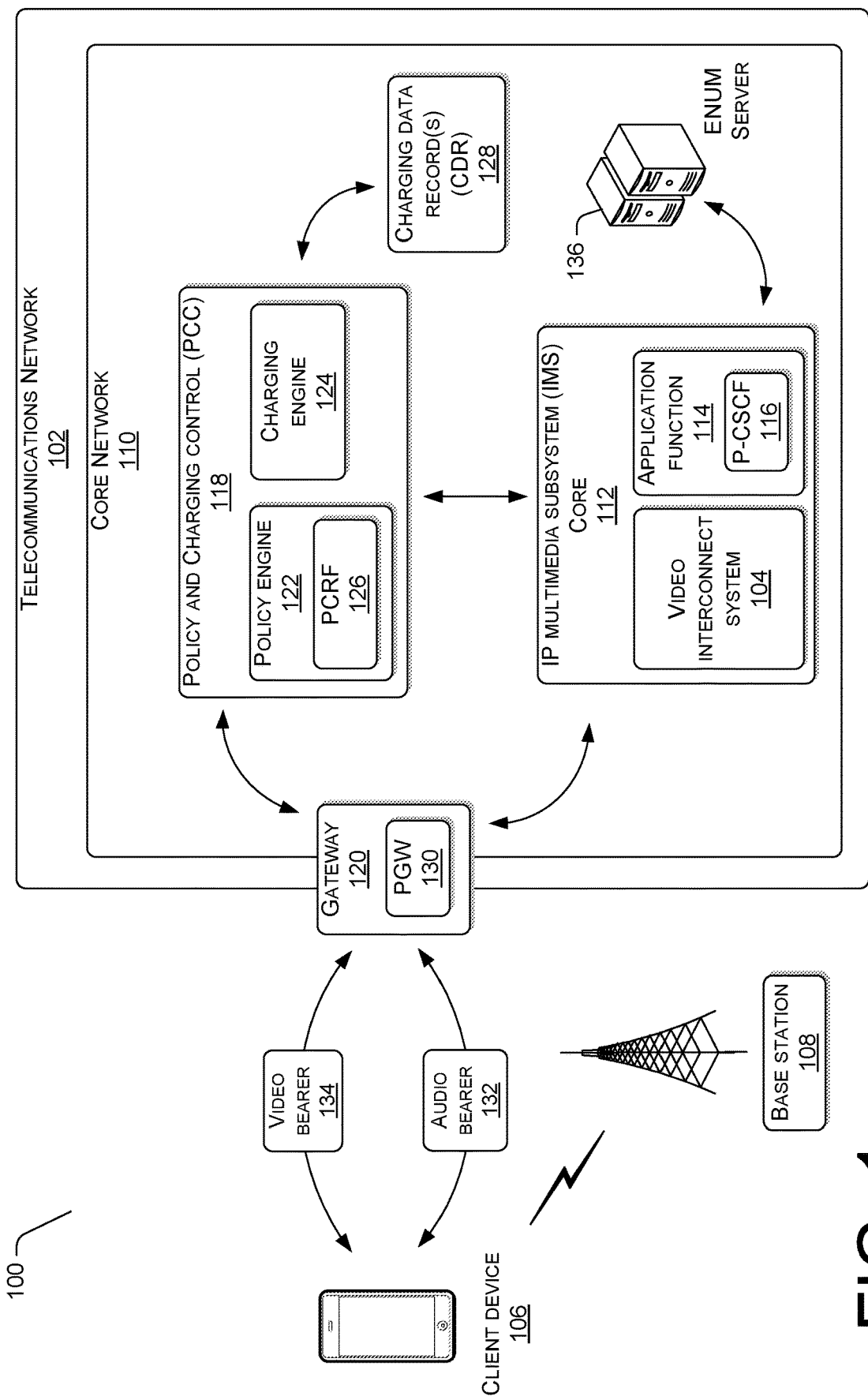
FIG. 1 illustrates an example architecture of a core network in a mobile telecommunication network for implementing the Video over LTE (ViLTE) communications via a video interconnect system.

This disclosure describes techniques that provide control of a Video over Long Term Evolution (ViLTE) call between two client devices, based on domain information associated with the interacting telecommunications service providers. Particularly, a video interconnect system is described that may selectively establish a ViLTE (i.e. a video communication session) between an originating client device and a recipient client device. In some examples, the video interconnect system may selectively establish a ViLTE based on one or more rules, such as availability of network bandwidth, bandwidth consumption of the video component of the ViLTE, or established service agreements between the telecommunication service providers, over the mobile telecommunications network.

In various examples, the video interconnect system may receive a Session Interface Protocol (SIP) message that an originating client device has initiated a ViLTE communication with another, recipient client device. The SIP message may specify a media format and protocol that is to be used for the intended communication. In doing so, the video interconnect system may retrieve domain information from the originating client device that initiated the ViLTE, the recipient device, or a combination of both. The domain information may include a Public Land Mobile Network ID (PLMN ID). The PLMN ID comprises of a Mobile Country Code (MCC) and a Mobile Network Code (MNC), which in combination identifies a telecommunications service provider. Alternatively, or additionally, the domain information may include a Mobile Station International Subscriber Directory Number (MSISDN) that identifies a subscription in a Global System for Mobile Communications (GSM) or a Universal Mobile Telecommunications System (UMTS) network, or an International Mobile Subscriber Identity (IMISI).

In doing so, the video interconnect system may transmit the domain information of the originating client device and the recipient client device, to a Proxy-Call Session Control Function (P-CSCF) via a Serving-Call Session Control Function (S-CSCF) via an Interrogating Call Session Control Function (I-CSCF). The P-CSCF may validate the correctness of the SIP message and generate charging information that is to be collected by charging network nodes, based on the domain information of the originating client device and the recipient client device.

In various examples, the S-CSCF may process location registration and authentication of the originating client device, based at least in part on the domain information. The video interconnect system may transmit, via the P-CSCF, the domain information along with the ViLTE communication request to a Policy and Charging Rules Function (PCRF), which is part of a Policy Control and Charging (PCC) architecture. Particularly, the P-CSCF may send the domain information to the PCRF as an online Attribute Value Pair (AVP) code that defines a charging rule. A format of the AVP code may include the domain information of the originating client device and recipient client device.

The PCRF may act as a policy decision point for the telecommunications service provider to determine whether to establish the video communication between the originating client device and the recipient client device and potentially may determine billing terms. The PCRF policy decision may be based on one or more rules.

In one non-limiting example, one rule may be based on determining an availability of network bandwidth to initiate the video communication on the mobile telecommunications network. For example, the one or more rules may use trans-rating techniques to automatically reduce a data usage rate of the video component of an ViLTE communication. Trans-rating techniques may be selectively employed based on an availability of bandwidth to initiate the ViLTE communication. For example, one rule may be based on a determination that reducing the bit-rate of the video component of an ViLTE communication to a particular bit-rate is substantially congruent with a particular amount of available bandwidth. Alternatively, or additionally, trans-rating techniques may be employed in response to an existing cooperative service agreement between the telecommunications service providers, or based on a service agreement between a network subscriber and telecommunications service provider.

In a second non-limiting example, one rule may include verifying that a cooperative service agreement is in place between the interacting telecommunications service providers of the originating and the recipient client devices. In some examples, the service agreement may stipulate fees for different telecommunication services, such as connecting VoLTE communication and ViLTE communication. Further, a fee schedule may be based on absolute bandwidth consumption, and bandwidth consumption during peak and non-peak network traffic periods. The video interconnect system may also verify that a cooperative service agreement is in place by first identifying, via domain information, the respective telecommunications service providers of the originating and recipient client devices.

Moreover, in response to determining that a ViLTE communication may be initiated between the originating and recipient client devices, the video interconnect system may cause the PCRF to exchange messages with a Packet Data Network Gateway (PGW) or other gateways to establish the recipient client device as a video call bearer of the ViLTE. Alternatively, the video interconnect system may elect to block establishing a ViLTE communication between the originating client device and the recipient client device, based at least in part on the PCRF policy decision. In doing so, the video interconnect system may cause the PCRF and the PGW to exchange messages that establish the recipient client device as an audio call bearer, but not a video bearer. In this instance, the recipient device may make a VoLTE communication but not a ViLTE communication.

Additionally, this disclosure describes techniques that facilitate generating termination charges for a video and/or audio communication session for a ViLTE that is established between an originating client device and a recipient client device. In various examples, the video interconnect system may elect to establish separate termination charges for a video component and an audio component of a ViLTE communication. For example, the video component may be charged and metered based on data usage associated with the video transmission. Further, the audio component may be charged and metered based on the duration and relative location of the originating client device and the recipient client device.

The video interconnect system may establish the relative location of the originating and recipient client devices using some of the above-referenced domain information, such as an MSISDN number. Further, the video interconnect system may transmit the domain information of the originating client device and the recipient client device, to the P-CSCF via the S-CSCF. The P-CSCF and/or the I-CSCF may generate charging information that is to be collected by charging network nodes of the telecommunications service provider. In various examples, the P-CSCF may determine charging information for a video component of a ViLTE communication using data relating to network data usage, requisite bandwidth, or a Quality of Service (QoS) guarantee. In some instances, charging information may be proportional to available network bandwidth. For example, an ViLTE communication initiated during peak network usage periods may be charged a premium fee for a bandwidth allotment. Further, with regards to the audio component of the ViLTE communication, the P-CSCF may determine charging information using data relating to the duration of the ViLTE communication, as well as the origination and destination locations of the originating client device and recipient client device, respectfully.

The video interconnect system may transmit, via the P-CSCF, the domain information and charging information to the PCRF. The domain information may be transmitted as an AVP code that includes the domain information of the originating and recipient client devices. Further, the video interconnect system may cause the PCRF to generate charge rate data based at least in part on the AVP code and charging information received via the P-CSCF. For example, the PCRF may access origin and destination information from the online AVP code to determine a termination fee for an audio component of the ViLTE communication. Further, the PCRF may access charging information received via the P-CSCF to determine a termination fee for the video component of the ViLTE communication, based on data usage and a network bandwidth allotment during peak or non-peak network usage periods.

In some examples, the video interconnect system may add the charge rate data generated by the PCRF to the Charging Data Record (CDR) associated with the subscriber of the originating client device. In doing so, the subscriber of the originating client device may be charged separately for the video and audio components of the ViLTE communication.

The techniques described herein may be implemented in a number of contexts. Several example implementations and context are provided with reference to the following figures. Further, the term "techniques," as used herein, may refer to system(s), method(s), computer-readable instruction(s), module(s)m algorithms, hardware logic, and/or operation(s) as permitted by the context described above and throughout the document.

FIG. 1 illustrates an example architecture 100 of a core network in a telecommunication network 102 for implementing the Video over LTE (ViLTE) communications via a video interconnect system 104. The example architecture 100 may include a telecommunications network 102 that serves multiple client devices, such as client device 106. Client device 106 may include any device that can initiate a ViLTE communication session using the wireless communication services of the mobile telecommunication network 102. Client device 106 can make multimedia calls (i.e. audio and video communications) over a LTE network or over a WLAN.

The mobile telecommunication network 102 may include multiple base stations, such as base station 108, as well as a core network 110. The telecommunications network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The core network 110 may provide telecommunication and data communications services to multiple client devices. For example, the core network 110 may connect client devices to other telecommunication and data communication networks, such as the Internet and a public switched telephone network (PSTN). Accordingly, data packet communications via the core network 110 and the Internet may support a variety of services. In various embodiments, an IP Multimedia Subsystem (IMS) core 112 may reside in the core network 110 of the mobile telecommunication network 102.

In the illustrated example, the IMS core 112 may include the video interconnect system 102 and an application function (AF) 114. In one example, the AF 114 may be a Proxy Call Session Control Function (P-CSCF) 116 or an equivalent function. For example, the P-CSCF 116 may route incoming SIP messages to an IMS registrar server. The P-CSCF 116 may interact with an Interrogating Call Session Control Function (I-CSCF) to identify a correct Service Call Session Control Function (S-CSCF) to route incoming SIP messages. Particularly, the I-CSCF may interrogate the Home Subscriber Server (HSS) to obtain the address of a correct S-CSCF to process the incoming SIP messages. The S-CSCF may communicate with a telephony application server (TAS) that resides in the core network 110. The TAS may route voice and/or data communications within the mobile telecommunication network 102 and with other networks, including public switch telephone networks (PSTNs). For example, the TAS may be a SIP application server that handles IP telephony for voice over LTE (VoLTE) services. Collectively, the CSCFs may handle Session Initiation Protocol (SIP) sessions, which are communication sessions for packet-based voice and video calls, instant messaging over IP networks, and/or so forth.

In the illustrated example, the core network 110 may include the IMS core 112, a Policy and Charging Control (PCC) 118, and a gateway 120. The PCC 118 may enable detection of communication service data flow and provide parameters for policy control and/or charging control. Particularly, the PCC 118 may include a policy engine 122 and a charging engine 124. The policy engine 122 may be a software component that determine policy and enforces policy rules, and services to establish calls and allocate bandwidth to call bearers. In one example, the policy engine may be a Policy and Charging Rules Function (PCRF) 126 or another equivalent core network component of the telecommunications network 102. Accordingly, the policy engine 122 may interface with the video interconnect system 104, the AF 114, or a combination of both, to handle incoming and outgoing VoLTE and ViLTE communication sessions.

Moreover, the charging engine 124 may enable the mobile telecommunication network 102 to monitor the services, such as data, voice, text, etc., that are used by each subscriber, and charge the subscribers in real-time based on service usage. In various embodiments, the charging engine 124 may be an Online Charging System (OCS) or another equivalent core network component of the mobile telecommunication network 102. In some examples, the charging engine 124 may interface with a Charging Data Record (CDR) 128. The CDR 128 may comprise of a database of subscriber charges that are associated with the telecommunication network 102.

In the illustrated example, the gateway 120 may include one or more servers and related components that are tasked with providing connectivity between the IMS core 112 and the client devices (e.g., the client device 106) by acting as a point of entry and exit for data traffic. In turn, the IMS core 112 may provide the client devices with data access to external packet data networks, such as the networks of other wireless telecommunication providers. Accordingly, the gateway 120 may perform functions such as policy enforcement, packet filtering, packet screening, and/or charging support. In various embodiments, the gateway 120 may be a Packet Data Network Gateway (PGW) 130 or another equivalent core network component of the mobile telecommunication network 102.

In various embodiments, the policy engine 122, the charging engine 124, video interconnect system 104, and the gateway 120 may act in concert to perform the metering and management of ViLTE and VoLTE communications. During the initiation of an incoming or outgoing VoLTE communication for the client device 106, the AF 114 may send a connection request to the policy engine 122 requesting data bandwidth allocation for a VoLTE communication. For example, the AF 114 may send such a request to the policy engine 122 via an IMS Rx interface or another equivalent IMS interface. In turn, the policy engine 122 may send a request to the gateway 120 to establish an audio bearer 132, which is an audio communication tunnel that carries an audio data stream for the VoLTE communication. In response, the gateway 120 may establish an audio bearer 132 between the IMS core 112 and the client device 106 so that the VoLTE communication may be connected.

Particularly, the policy engine 122 may send a request to the gateway 120 to establish a video bearer 134, which is a video communication tunnel that carries video stream data for the ViLTE communication. In response, the gateway 120 may establish a video bearer 134 between the IMS core 112 and the client device 106 so that the ViLTE communication may be connected. It will be appreciated that any time the gateway 120 establishes a video bearer 134 for ViLTE communication, the gateway 120 will also automatically establish an audio bearer 132. Such automatic establishment of the audio bearer 132 is due to the fact that a ViLTE communication by default employs both an audio stream and a video stream.

On the other hand, if the video interconnect system 104 indicates that a ViLTE communication cannot be established, the policy engine 122 may deny the ViLTE communication. Instead, the policy engine 122 may fulfill the original ViLTE communication request as a VoLTE communication by establishing the audio bearer 132 to connect the communication.

Moreover, as part of initiating a ViLTE or VoLTE communication session, the video IMS Core 112 may interact with an E.164 Number Mapping (ENUM) server 136 to return domain information associated with the originating client device 202 and the recipient client device.

Figure 2:
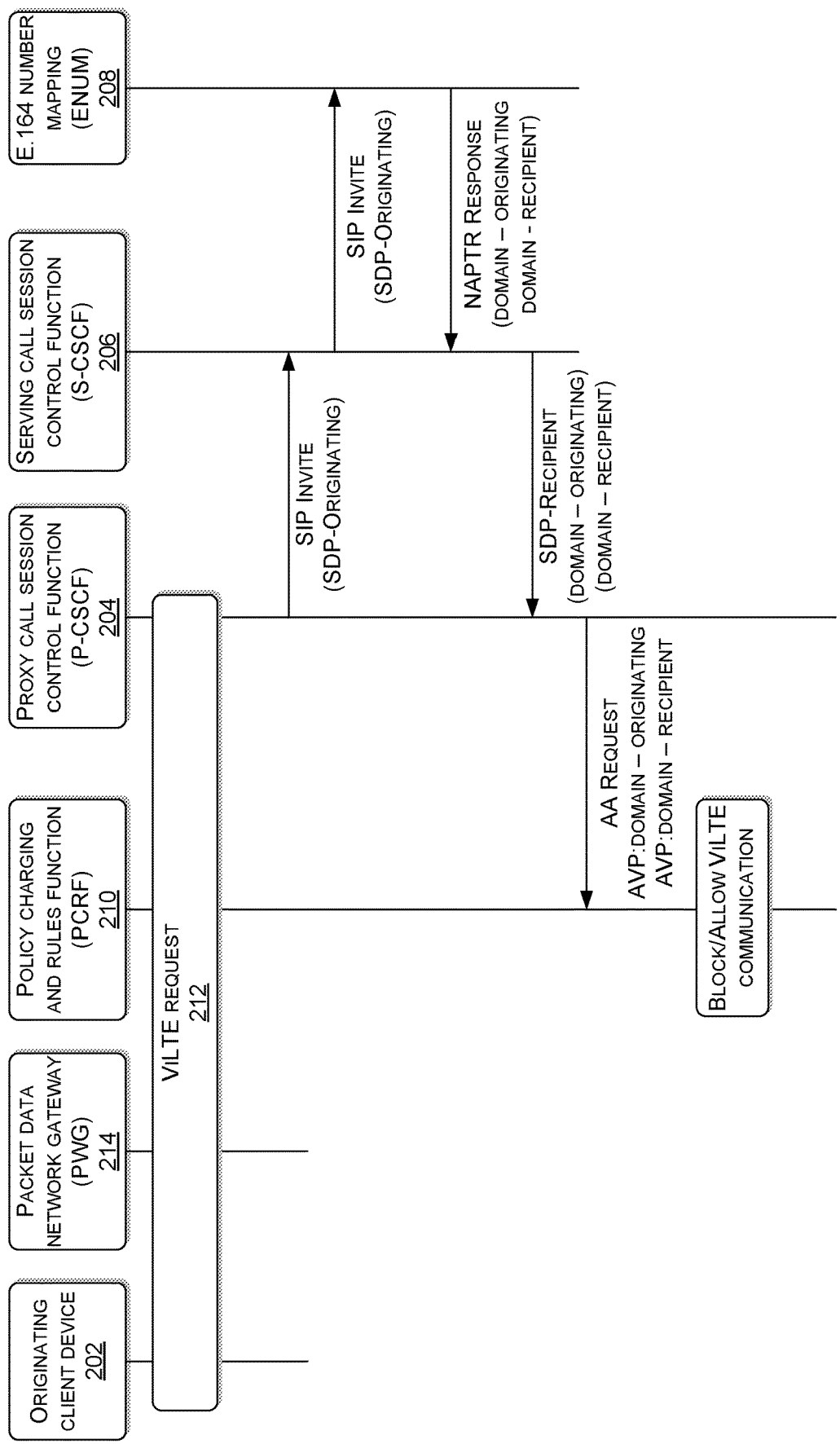
FIG. 2 illustrates a block diagram of video interconnect system process for initiating a Video over Long Term Evolution (ViLTE) communication session between interacting client devices.

FIG. 2 illustrates a block diagram of a video interconnect system process for initiating a Video over Long Term Evolution (ViLTE) communication session between interacting client devices. In the illustrated example, an originating client device 202 may initiate a ViLTE communication by transmitting a Session Initiation Protocol (SIP) INVITE request to a Proxy Call Session Control Function (P-CSCF) 204. The SIP INVITE is an invite message that initiates a SIP dialog to establish a ViLTE or a Voice over LTE (VoLTE) communication session. The SIP INVITE may include a Session Description Protocol (SDP). The SDP of the originating client device 202 does not deliver communication media between the originating client device and a recipient client device. Instead, the SDP is used for negotiation of media type, format, and associated properties.

Further, the P-CSCF 204 may behave as a SIP proxy by forwarding SIP messages between the originating client device 202 and elements within the IMS Core Network. The P-CSCF 204 may add charging information to the SIP INVITE message and then forward the SIP INVITE to the Serving Call Session Control Function (S-CSCF) 206. The S-CSCF 206 may provide session set-up, session tear-down, session control and routing functions. Further, the S-CSCF 206 may generate records for billing purposes for all sessions under its control. The S-CSCF 206 may interrogate an E.164 Number Mapping (ENUM) server 208 to retrieve IP routable information, service/platform information associated with the originating client device and the recipient client device. In the illustrated example, the video interconnect system may cause the ENUM server 208 to return domain information associated with the originating client device 202 and the recipient client device. Particularly, the ENUM server 208 may include the domain information in a Name Authority Pointer (NAPTR) Response that is sent to the S-CSCF 206.

Moreover, the P-CSCF 204 may send an authorization-authentication (AA) request to a Policy Charging and Rules Function (PCRF) 210 that includes the domain information received via the S-CSCF 206. The AA request may include an Attribute Value Pair (AVP) header that describes the domain information of the originating client device 202 and the recipient device. The PCRF 210 may determine policy control decisions and determine how communication session data flows are treated in an enforcement function (i.e. Packet Data Network Gateway). The video interconnect system may interact with the PCRF 210 by providing one or more rules that relate to an authorization of a ViLTE communication session between an originating client device and a recipient client device.

In one example, the PCRF 210 may authorize the ViLTE request 212 and associate service information about the allowed service(s) based at least in part on one or more rules established by the video interconnect system. In doing so, a video bearer and audio bearer may be established between a Packet Data Network Gateway (PGW) 214 of the telecommunications network and the originating client device 202. In another example, the PCRF 210 may block the ViLTE request 212, based at least in part on one or more rules established by the video interconnect system. In this instance, an audio bearer may be established between a PGW 214 of the telecommunications network and the originating client device 202.

Figure 3:
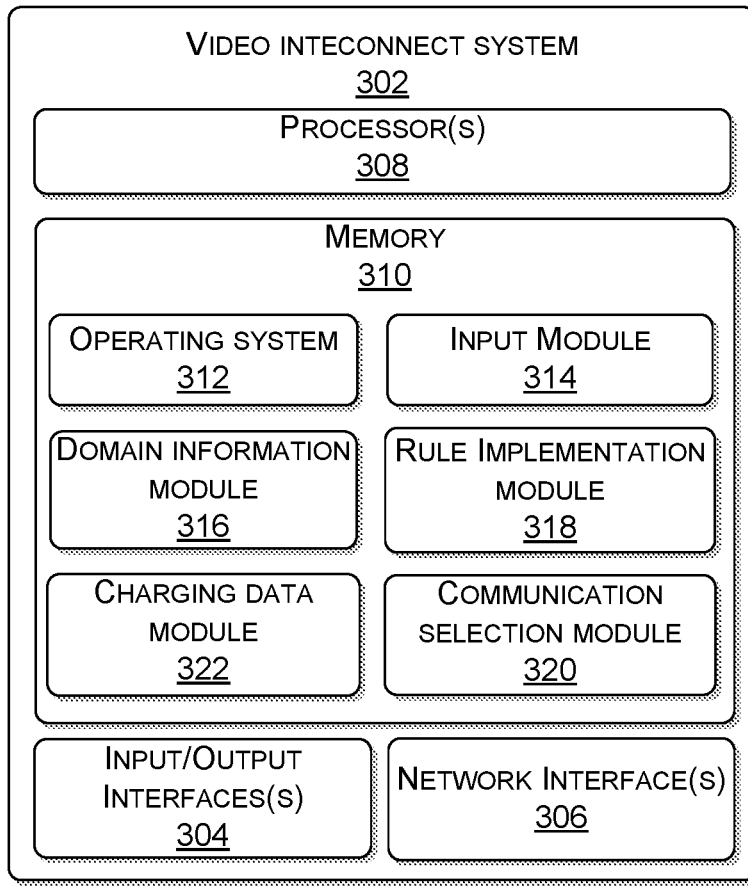
FIG. 3 illustrates a block diagram of the video interconnect system that is integrated into an IMS core of a mobile telecommunications network.

FIG. 3 illustrates a block diagram of the video interconnect system 302. In the illustrated example, the video interconnect system 302 may facilitate establishing a Video over Long Term Evolution (ViLTE) communication session between two interacting client devices. In some examples, the video interconnect system may selectively establish a ViLTE communication based on one or more rules, such as domain information of the interacting client device, availability of network bandwidth, bandwidth consumption of the video component of the ViLTE communication, or established service agreements between the telecommunication service providers, over the mobile telecommunications network. Further, the video interconnect system may facilitate generating termination charges for a video and/or audio communication session for a ViLTE communication, based on one or more rules. For example, a video component of the ViLTE communication may be charged and metered based on data usage, and an audio component of the ViLTE communication may be charged and metered based on the duration and relative location of the interacting client devices.

In the illustrated example, the video interconnect system 302 may correspond to the video interconnect system 104. Further, the video interconnect system 302 may include input/output interface(s) 304. The input/output interface(s) 304 may include any type of output interface known in the art, such as a display (e.g. a liquid crystal display), speakers, a vibrating mechanism, or a tactile feedback mechanism. Input/output interface(s) 304 also include ports for one or more peripheral devices, such as headphones, peripheral speakers, or a peripheral display. Further, the input/output interface(s) 304 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the video interconnect system 302 may include network interface(s) 306. The network interface(s) 306 may include any sort of transceiver known in the art. For example, the network interface(s) 306 may include a radio transceiver that performs the function of transmitting and receiving radio frequency communications via an antenna. In addition, the network interface(s) 306 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 306 may include wired communication components, such as an Ethernet port or a Universal Serial Bus (USB).

Further, the video interconnect system 302 may include one or more processor(s) 308 that are operably connected to memory 310. In at least one example, the one or more processor(s) 308 may be a central processing unit(s) (CPU), graphics processing unit(s) (GPU), a both a CPU and GPU, or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 308 may also be responsible for executing all computer applications stored in the memory, which can be associated with common types of volatile (RAM) and/or nonvolatile (ROM) memory.

In some examples, memory 310 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 310 may include an operating system 312, an input module 314, a domain information module 316, a rule implementation module 318, a communication selection module 320, a charging data module 322. The operating system 312 may be any operating system capable of managing computer hardware and software resources. The input module 314, a domain information module 316, the rule implementation module 318, the communication selection module 320, and the charging data module 322. may include routines, program instructions, objects, and/or data structures that perform particular tasks or implement particular abstract data types.

The input module 314 may be configured to receive a communication request to initiate a real-time communication session between client devices. In some examples, the input module 314 may receive the communication request from a client device that initiates the communication request. In other examples, the input module 314 may receive the communication request from a telecommunications service provider associated with the client device. Moreover, the input module 314 may be further configured to receive metadata associated with a real-time communication session. In a non-limiting example, the metadata may include an indication that the real-time communication was a VoLTE communication, or a ViLTE communication, a duration of the real-time communication session, or an amount of data usage associated with transmission of a video component of a ViLTE communication. In various examples, the metadata may also include an indication whether trans-rating techniques were implemented to reduce the bit-rate of video component. In this instance, an indication that trans-rating techniques were employed may assist the charging data module 322 to properly determine a charge for the real-time communication session.

Further, the domain information module 316 may request and receive domain information from the client devices interacting with the video interconnect system. In various examples, the domain information may include a Public Land Mobile Network ID (PLMN ID). The PLMN ID comprises of a Mobile Country Code (MCC) and a Mobile Network Code (MNC), which in combination identifies a telecommunications service provider. Alternatively, or additionally, the domain information may include a Mobile Station International Subscriber Directory Number (MSISDN) that identifies a subscription in a Global System for Mobile Communications (GSM) or a Universal Mobile Telecommunications System (UMTS) network, or an International Mobile Subscriber Identity (IMISI). The domain information module 316 may format the domain information as an online Attribute Value Pair (AVP) code that defines a charging rule. The AVP code may include the domain information of the originating client device and the recipient client device.

Additionally, the rule implementation module 318 may include one or configured rules that facilitate establishing a ViLTE communication between an originating client device and a recipient client device. For example, the rule implementation module 318 may facilitate determining an availability of bandwidth to initiate the ViLTE communication on the mobile telecommunications network, a rule for verifying that a cooperative service agreement is in place between the interacting telecommunications service providers of the originating client device and the recipient client device. In some examples, the cooperative service agreement may stipulate terms, conditions, and charges that relate to ViLTE communication sessions between interacting client devices. Further, the cooperative service agreements may also stipulate threshold bandwidth allocations for ViLTE communications, and peak and non-peak periods where ViLTE communications may incur a premium charge for bandwidth allocations. Additionally, or alternatively, the cooperative service agreement may also stipulate whether a ViLTE communication may even occur between client devices that are associated with the interacting telecommunications service providers.

Moreover, the rule implementation module 318 may include a rule for verifying that subscriber service agreement permits ViLTE communications, or a Quality Assurance Agreement that guarantees a particular network bandwidth allotment during peak and non-peak network traffic periods.

Additionally, the communication selection module 320 may selectively establish a ViLTE communication or a VoLTE communication between interacting client devices. The communication selection module 320 may premise a selection of a ViLTE or VoLTE communication on the outcome of one or more configured rules, as implemented by the rule implementation module 318.

Moreover, the charging data module 322 may generate charge data for a video component and an audio component of a ViLTE communication. The charge data may be based on one or more rules derived from the rule implementation module 318. For example, a video component of the ViLTE communication may be charged and metered based on data usage, and an audio component of the ViLTE communication may be charged and metered based on the duration and relative location of the interacting client devices.

In some examples, the charging data module 322 may generate charge data for audio component and the video component of the ViLTE communication. The P-CSCF may interact with the PCRF to generate charge data based on one or more rules. The PCRF may include one or more rules intended to quantify charge data for an audio component and a video component of the ViLTE communication. The one or more rules may be based at least in part on the domain information of the originating client device and the recipient client device. For example, an audio component of an ViLTE communication that is established between an originating client device and a recipient client device that are in different countries may attract a higher charge relative to an originating client device and a recipient client device that are located in a same locale.

In some examples, the charging data module 322 may quantify charge data for a video component of the ViLTE communication based at least in part on the network data usage associated with transmission of the video component of the ViLTE communication. In some examples, charge data may be a function of bandwidth consumption for transmission of the video component of the ViLTE communication during peak and non-peak network traffic periods. For example, a network bandwidth allotment during a peak network traffic period may attract a higher video communication charge rate relative to a network bandwidth allotment during a non-peak network traffic period. In some examples, the video communication charge rates may be based on a Quality of Service (QoS) guarantee. A QoS guarantee may refer to a minimum resolution of the video component of the ViLTE communication, or a minimum allotment of network bandwidth during peak or non-peak network traffic periods. For example, a service agreement between a client subscriber and the telecommunication service provider may stipulate a video communication charge rate that is commensurate with a QoS guarantee. In this example, the video communication charge rate that includes a QoS guarantee may be higher than the video communication charge rate without the QoS guarantee.

Further, the charging data module 322 may quantify a service charge to the recipient telecommunication service provider that corresponds to bandwidth consumption for connecting the video component of the ViLTE communication.

Figure 4:
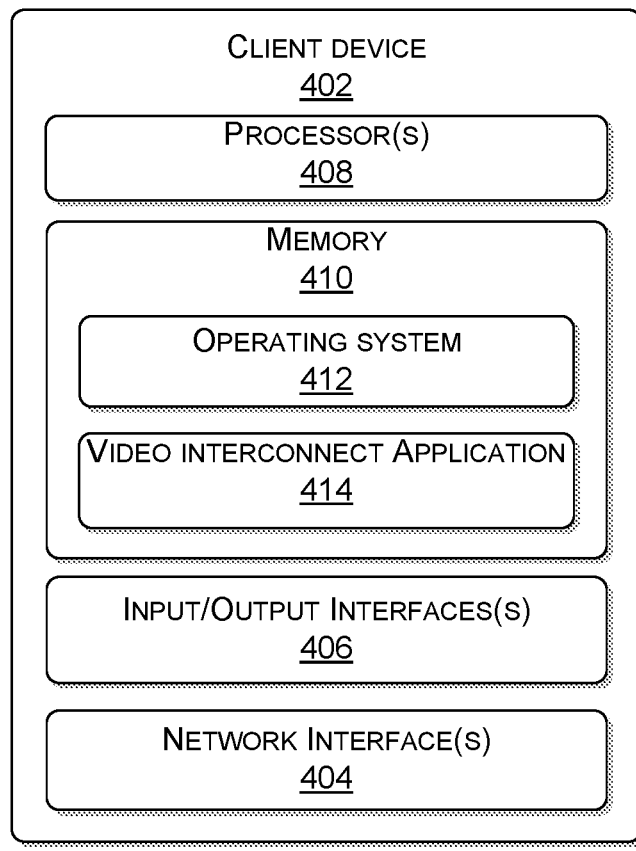
FIG. 4 illustrates a block diagram of a client device that interacts with the video interconnect system of a mobile telecommunications network.

FIG. 4 illustrates a block diagram of a client device 402 that interacts with the video interconnect system 104 of a mobile telecommunication network 102. The client device 402 may correspond to client device 106. Particularly, the client device 402 may be communicatively coupled to the video interconnect system 104 via the mobile telecommunication network 102, via network interface(s) 404. The network interface(s) 404 may correspond to network interface(s) 306. In this example, the client device 402 may transmit and receive data to and from the video interconnect system 302, or one or more computing resources, via the network interface(s) 404. The data may include audible data received from a client, audible data intended for transmission to the client, and data packets of computer executable instructions received from the video interconnect system 302 that are intended for transmission to a computing resource. In some examples, the data packets may automate a performance of one or more actions on the computing resource.

Further, the client device 402 may include input/output interface(s) 406 that transmit and receive audible data to and from a client. The input/output interface(s) 406 may correspond to the input/output interface(s) 304. For example, the input/output interface(s) 406 may include a speaker component and a microphone component that selectively transmits and receives audible communications to and from a client. The microphone may be configured to receive audible data from a client that is located within a predetermined distance of the client device 402. In various examples, the proximity of the client device 402 to the client is based at least in part on a capability of the microphone to capture audible data from the client.

In the illustrated example, the client device 402 may include one or more processor(s) 408 operably connected to memory 410. The one or more processor(s) 408 may correspond to the one or more processor(s) 308, and the memory 410 may correspond to the memory 310.

In the illustrated example, the memory 410 may include an operating system 412 and a video interconnect application 414. The operating system 412 may be used to implement the video interconnect application 414. The operating system may be any operating system capable of managing computer hardware and software resources. The video interconnect application 414 may include routines, program instructions, objects, and/or data structures that perform particular tasks or implement particular abstract data types.

Further, the video interconnect application 414 may be configured to communicate audio data with the video interconnect system 302. In some examples, the video interconnect application 414 may be configured to perform the computational processing that corresponds to the one or more modules of the video interconnect system 302, such as the input module 314, domain information module 316, the rule implementation module 318, the communication selection module 320, and the charging data module 322.

Figure 5:
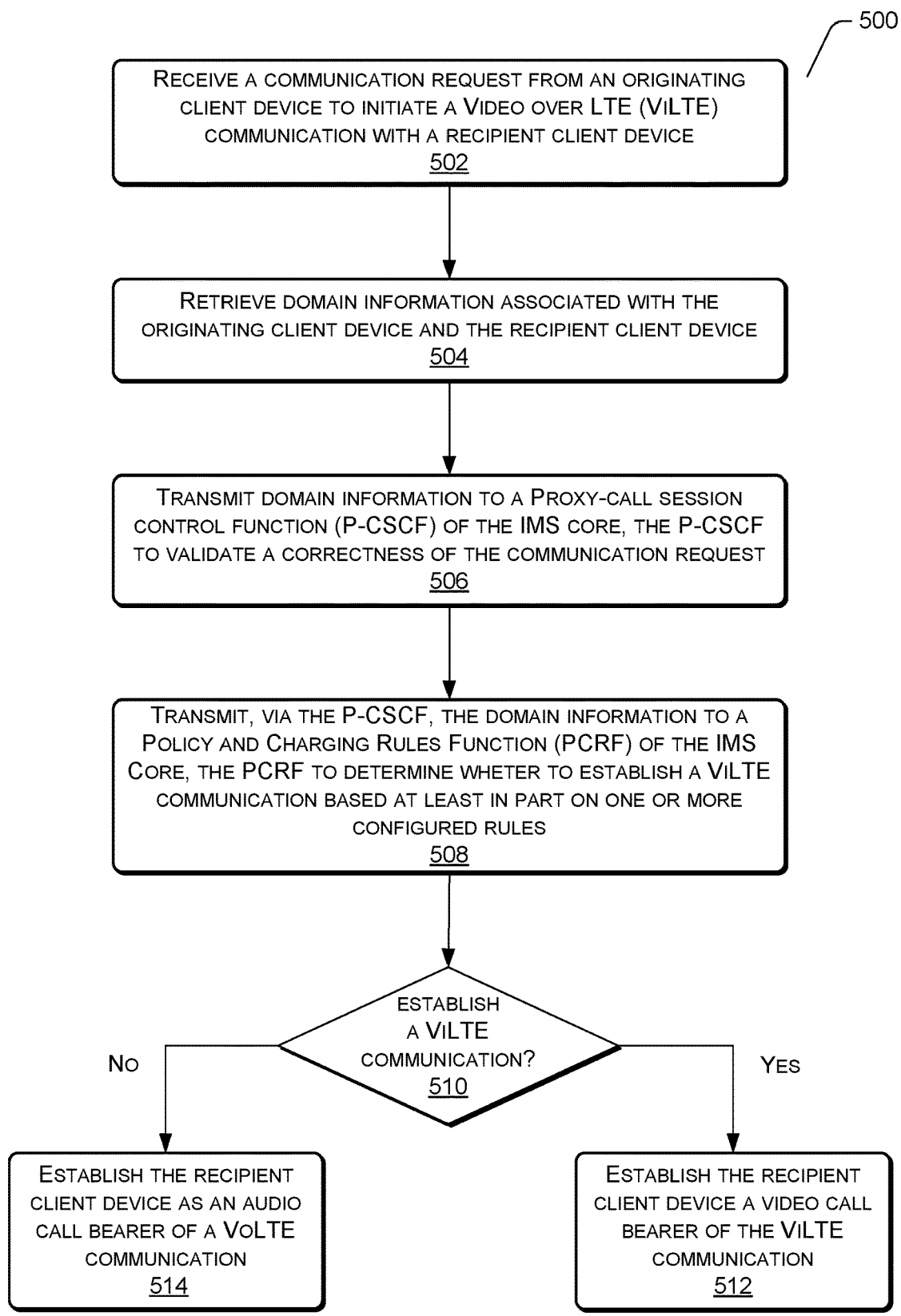
FIG. 5 illustrates a flow diagram that describes a process for establishing a video communication session between an originating client device and a recipient client device over a mobile telecommunications network.
Figure 6:
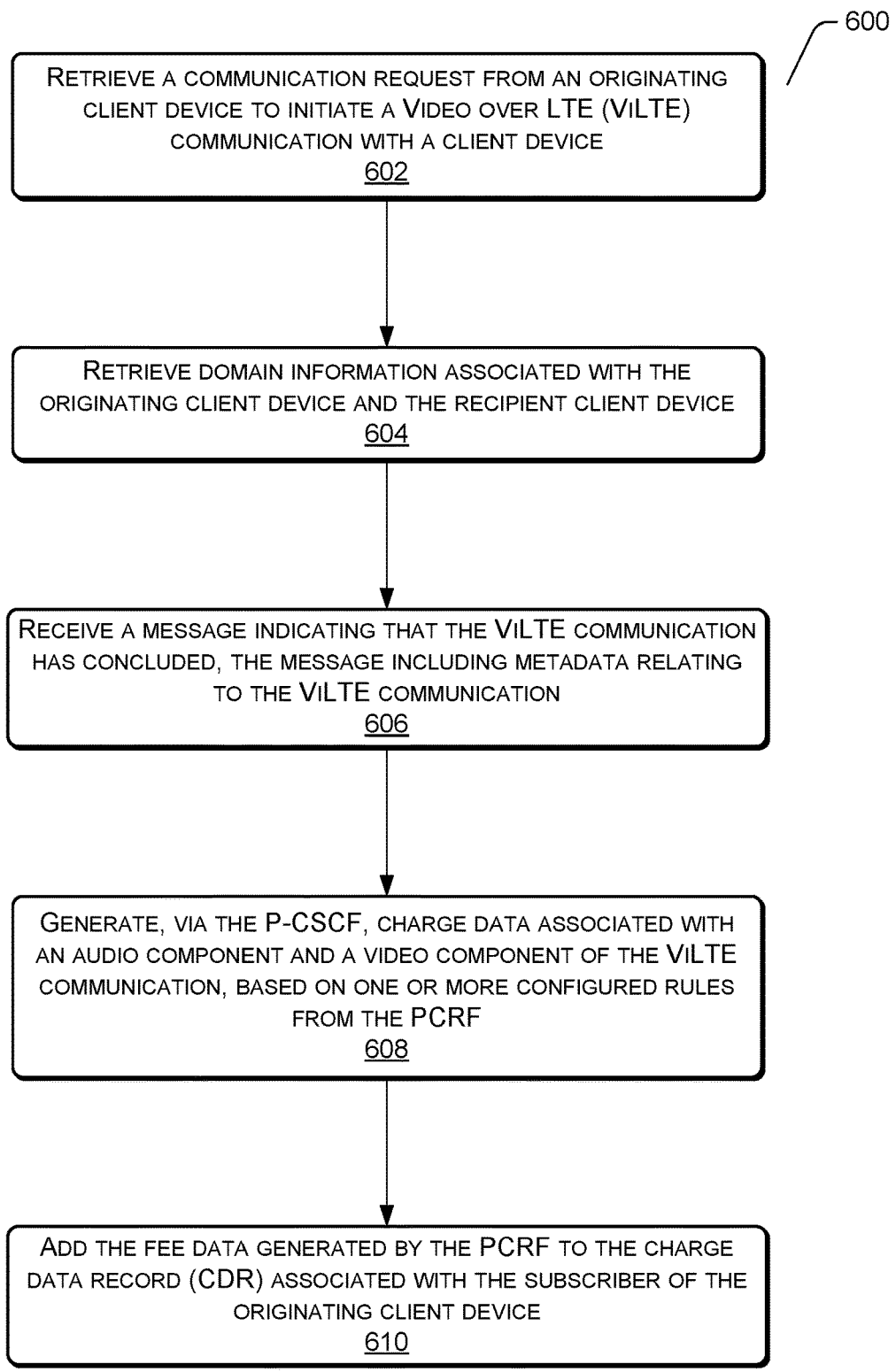
FIG. 6 illustrates a flow diagram that describes a process for generating termination charges for a video and/or an audio communication session that is established between an originating client device and a recipient client device.

FIGS. 5 and 6 present processes 500 and 600 that relate to operations of the video interconnect control system. Each of processes 500 and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to the example architecture 100 of FIG. 1.

FIG. 5 illustrates a video interconnect system process for a Video over Long Term Evolution (ViLTE) call between two client devices, based on domain information associated with the interacting telecommunications service providers. Particularly, a video interconnect system may selectively establish a ViLTE (i.e. a video communication session) between an originating client device and a recipient client device. For example, unlike a VoLTE communication, a ViLTE communication may generate a significant amount of data and consume a considerable amount of network bandwidth. As a result, the video interconnect system may establish a ViLTE communication based on one or more rules, such as availability of network bandwidth, bandwidth consumption of the video component of the ViLTE, or established service agreements between the telecommunication service providers.

At 502, the video interconnect system may receive a communication request from an originating client device to initiate a ViLTE communication with a recipient client device. The communication request may comprise of a Session Interface Protocol (SIP) message that specifies a media format and protocol that is to be used for the intended ViLTE communication. In some examples, the originating client device and the recipient client device may be associated with a common telecommunications service provider.

Alternatively, the originating client device and recipient client device may be associated with different telecommunications service providers.

At 504, the video interconnect system may retrieve domain information from the originating client device and the recipient client device. The domain information may include a Public Land Mobile Network ID (PLMN ID). The PLMN ID may include a Mobile Country Code (MCC) and a Mobile Network Code (MNC), which in combination may be used to identify the telecommunications service provider. Alternatively, or additionally, the domain information may include a Mobile Station International Subscriber Directory Number (MSISDN) or an International Mobile Subscriber Identity (IMISI). The MSISDN number may identify a subscription in a Global System for Mobile Communications (GSM) or a Universal Mobile Telecommunications System (UMTS) network. The MSISDN may be used as a primary key to a subscriber record that contains details of a network subscriber that is authorized on the mobile telecommunications network. The IMISI number may be used to identify a client of a telecommunications network and the mobile telecommunications network, itself.

At 506, the video interconnect system may transmit the domain information of the originating client device and the recipient client device, to a Proxy-Call Session Control Function (P-CSCF) via a Serving-Call Session Control Function (S-CSCF). The P-CSCF may validate the correctness of the SIP message.

At 508, the video interconnect system may transmit, via the P-CSCF, the domain information to a Policy and Charging Rules Function (PCRF), which is part of a Policy Control and Charging (PCC) architecture. Particularly, the P-CSCF may send the domain information as an online Attribute Value Pair (AVP) code that defines the charging rule. A format of the AVP code may include the domain information of the originating client device and recipient client device.

At 510, the PCRF may act as a policy decision point for the telecommunications service provider to determine whether to establish the ViLTE communication between the originating client device and the recipient client device. The PCRF policy decision may be based on one or more rules. In one non-limiting example, one rule may include determining an availability of bandwidth to initiate the ViLTE communication on the mobile telecommunications network.

In a second non-limiting example, one rule may include verifying that a cooperative service agreement is in place between the interacting telecommunications service providers of the originating client device and the recipient client device. In some examples, the service agreement may stipulate fees for different telecommunication services, such as connecting VoLTE communications and ViLTE communications. Further, a fee schedule may be based on absolute bandwidth consumption, and bandwidth consumption during peak and non-peak network traffic periods. The video interconnect system may also verify that a cooperative service agreement is in place by first identifying, via domain information such as the PLMN ID, the respective telecommunications service providers of the originating and recipient client devices.

At 512, the video interconnect system may determine a ViLTE communication may be initiated between the originating client device and the recipient client device, based at least in part on the PCRF policy decision. In doing so, the video interconnect system may cause the PCRF and a Packet Data Network Gateway (PGW) to exchange messages that establish the recipient client device as a video call bearer of the ViLTE communication.

In some examples, the video interconnect system may employ trans-rating techniques to automatically reduce a data usage rate of the video component of an ViLTE communication. Trans-rating techniques may be selectively employed based on an availability of network bandwidth to initiate the ViLTE communication. For example, one rule may be based on a determination that reducing the bit-rate of the video component of an ViLTE communication to a particular bit-rate is substantially congruent with a particular amount of available bandwidth. Alternatively, or additionally, trans-rating techniques may be employed in response to an existing cooperative service agreement between the telecommunications service providers, or based on a service agreement between a network subscriber and telecommunications service provider.

At 514, the video interconnect system may elect to block establishing a ViLTE communication between the originating client device and the recipient client device, based at least in part on the PCRF policy decision. In doing so, the video interconnect system may cause the PCRF and the PGW to exchange messages that establish the recipient client device as an audio call bearer, but not a video bearer. In this instance, the recipient device may make a VoLTE communication but not a ViLTE communication.

In some examples, the video interconnect system may elect to block a ViLTE communication due to high bandwidth consumption, or lack of a cooperative service agreement between interacting telecommunication service providers.

FIG. 6 illustrates a video interconnect system process for generating termination charges for a video and/or audio communication session that is established between an originating client device and a recipient client device. In various examples, the video interconnect system may elect to establish separate termination charges for a video component and an audio component of a ViLTE communication. For example, the video component may be charged and metered based on data usage associated with the video transmission between the originating client device and the recipient client device. Further, the audio component may be charged and metered based on the duration and relative location of the originating client device and the recipient client device.

At 602, the video interconnect system may receive a communication request from an originating client device to initiate a ViLTE communication with a recipient client device. The originating client device may create a SIP message that specifies a media format and protocol that is to be used for the intended ViLTE communication.

At 604, the video interconnect system may retrieve domain information associated with the originating client device and the recipient client device. The domain information may include an MSISDN number that may be used to establish a geographic location of the originating client device or the recipient client device. For example, the MSISDN number may be used as a primary key by a telecommunications service provider to query a Home Location Register (HLR) that identifies a current location of a client device, at the time a ViLTE communication is initiated or received.

At 606, the video interconnect system may receive a message that ViLTE communications has concluded. The message may include metadata relating to the ViLTE communication from one of the originating client device, recipient client device, or a combination of both. The metadata may include a duration of the ViLTE communication, and data usage associated with transmission of the video component of the ViLTE communication.

At 608, the video interconnect system, via the P-CSCF, may generate charge data associated with audio component and the video component of the ViLTE communication. The P-CSCF may interact with the PCRF to generate charge data based on one or more rules. The PCRF may include one or more rules intended to quantify charge data for an audio component and a video component of the ViLTE communication. The one or more rules for determining charge data of the audio component of the ViLTE communication may be based at least in part on the domain information of the originating client device and the recipient client device. For example, an audio component of an ViLTE communication that is established between an originating client device and a recipient client device that are in different countries may attract a higher charge relative to an originating client device and a recipient client device that are located in a same locale.

Further, one or more rules to quantify charge data for a video component of the ViLTE communication may be based at least in part on the network data usage associated with transmission of the video component of the ViLTE communication. Charge data for the video component of the ViLTE communication may be a function of bandwidth consumption during peak and non-peak network traffic periods. For example, a network bandwidth allotment during a peak network traffic period may attract a higher video communication charge rate relative to a network bandwidth allotment during a non-peak network traffic period. In some examples, the video communication charge rates may be based on a Quality of Service (QoS) guarantee. A QoS guarantee may refer to a minimum resolution of the video component of the ViLTE communication, or a minimum allotment of network bandwidth during peak or non-peak network traffic periods. For example, a service agreement between a client subscriber and the telecommunication service provider may stipulate a video communication charge rate that is commensurate with a QoS guarantee. In this example, the video communication charge rate that includes a QoS guarantee may be higher than the video communication charge rate without the QoS guarantee.

Further, the one or more rules to quantify charge data may also include a service charge to the recipient telecommunication service provider that corresponds to bandwidth consumption for connecting the video component of the ViLTE communication.

At 610, the video interconnect system may add the charge data generated by the P-CSCF and PCRF to the charge rate data record (CDR) associated with the subscriber of the originating client device. In doing so, the subscriber of the originating client device may be charged separately for the video component of the ViLTE communication and the audio portion of the ViLTE communication.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under control of one or more processors:
receiving a communication request to initiate a real-time communication session between an originating client device and a recipient client device, the real-time communication session corresponding to a request for a Video over Long-Term Evolution (ViLTE) communication session;
transmitting an additional request for domain information to the originating client device and the recipient client device;
receiving an originating domain information of the originating client device and a recipient domain information of the recipient client device, based at least in part on the additional request;
determining a network bandwidth limit for a client account associated with the originating client device;
determining, using one or more rules, whether to establish a ViLTE communication session or a Voice over LTE (VoLTE) communication session between the originating client device and the recipient client device, based at least in part on the originating domain information and the recipient domain information;
establishing one of the ViLTE communication session or the VoLTE communication session between the originating client device and the recipient client device, based at least in part on the one or more rules; and
in response to establishing the ViLTE communication session, modifying a bit-rate of a video component of the ViLTE communication session, based at least in part on the network bandwidth limit.

2. The computer-implemented method of claim 1, wherein the originating domain information is associated with a first geographic location of the originating client device at a point in time associated with initiating the real-time communication session, and the recipient domain information is associated with a second geographic location of the recipient client device at the point in time.

3. The computer-implemented method of claim 1, wherein transmitting the additional request for domain information to the originating client device and the recipient client device is based at least in part on receipt of the communication request, and
wherein the originating domain information and the recipient domain information includes at least one of a Public Land Mobile Network ID (PLMN ID) or a Mobile Station International Subscriber Directory Number (MSISDN).

4. The computer-implemented method of claim 1, further comprising:
determining an available network bandwidth allocation to establish a ViLTE communication session, based at least in part on the one or more rules; and
determining that a requisite network bandwidth allocation for transmission of the ViLTE communication session is greater than the available network bandwidth allocation, based at least in part on the one or more rules, and
wherein, establishing the VoLTE communication session between the originating client device and the recipient client device, based at least in part on the requisite network bandwidth allocation being greater than the available network bandwidth allocation.

5. The computer-implemented method of claim 1, further comprising:

determining an available network bandwidth allocation to establish the ViLTE communication session, based at least in part on the one or more rules;

determining that a requisite network bandwidth allocation for transmission of the ViLTE communication session is greater than the available network bandwidth allocation, based at least in part on the one or more rules; and modifying the bit-rate of the video component of the ViLTE communication session to be equal to or less than the available network bandwidth allocation.

6. The computer-implemented method of claim 1, further comprising:

identifying a recipient telecommunications service provider associated with the recipient client device; and verifying that a cooperative service agreement is in place with the recipient telecommunications service provider, based at least in part on the one or more rules, and wherein, establishing the real-time communication session further comprises establishing the ViLTE communication session between the originating client device and the recipient client device, based at least in part on verifying that the cooperative service agreement is in place.

7. The computer-implemented method of claim 1, further comprising:

determining that the communication request to initiate the real-time communication session occurs during a peak network traffic period, based at least in part on the one or more rules, and wherein, establishing the real-time communication session further comprises establishing the VoLTE communication session between the originating client device and the recipient client device, based at least in part on the real-time communication session occurring during the peak network traffic period.

8. The computer-implemented method of claim 1, wherein the communication request comprises a Session Interface Protocol (SIP) message that specifies a media format and a protocol that is intended for the ViLTE communication session, and further comprising:

validating a correctness of the SIP message via a Proxy-Call Session Control Function.

9. A system, comprising:

one or more processors;

memory coupled to the one or more processors, the memory comprising:

an input module configured to receive a communication request to initiate a real-time communication session between a first client device and a second client device, the first client device having initiated the communication request, the communication request including a request for a Video over Long-Term Evolution (ViLTE) communication session;

a domain information module configured to retrieve a first domain information from the first client device and a second domain information from the second client device, the first domain information and the second domain information indicating a relative geographic location of the first client device and the second client device at a point in time of initiating the real-time communication session;

a rule implementation module configured to include one or more rules that facilitate establishing one of a ViLTE communication session or a Voice over LTE (VoLTE) communication session, and the rule implementation module further configured to determine whether a service agreement is in place with a client account associated with the first client device, the service agreement stipulating a geographic limitation on the ViLTE communication session; and a communication selection module configured to initiate the VoLTE communication session in response to the first client device being located outside the geographic limitation stipulated in the service agreement.

10. The system of claim 9, wherein the domain information module is further configured to transmit the first domain information and the second domain information to a charging data module as an online attribute value pair (AVP) code, the AVP code identifying a first geographic location of the first client device at the point in time of initiating the real-time communication session, and a second geographic location of the second client device at the point in time of initiating the real-time communication session.

11. The system of claim 9, wherein the rule implementation module is configured to include at least one rule of the one or more rules that corresponds to determining a network bandwidth allocation of the client account associated with the first client device, the rule implementation module further configured to determine whether a requisite bandwidth allocation for establishing a video component of the ViLTE communication session is less than the network bandwidth allocation for the client account, and wherein, the communication selection module is configured to establish the ViLTE communication session between the first client device and the second client device in response to the requisite bandwidth allocation being less than the network bandwidth allocation for the client account.

12. The system of claim 9, wherein the rule implementation module is configured to include at least one rule of the one or more rules that corresponds to determining whether a cooperative service agreement is in place with a telecommunications service provider associated with the second client device, wherein, the communication selection module is configured to establish the ViLTE communication session between the first client device and the second client device in response to the cooperative service agreement being in place.

13. The system of claim 9, wherein the service agreement further stipulates a network bandwidth allocation for the ViLTE communication session, wherein, the rule implementation module is further configured to determine whether a requisite bandwidth allocation for establishing a video component of the ViLTE communication session is less than the network bandwidth allocation, and wherein, the communication selection module is configured to establish the VoLTE communication session between the first client device and the second client device in response to the requisite bandwidth allocation being greater than the network bandwidth allocation within the service agreement.

14. The system of claim 9, wherein the rule implementation module is further configured to determine whether the first client device is within the geographic limitation stipulated within the service agreement, based at least in part on the first domain information, and wherein, the communication selection module is configured to establish the ViLTE communication session between the first client device and the second client device in response to the first client device being located within the geographic limitation at the point in time of initiating the real-time communication session.

15. One or more non-transitory computer-readable media storing computer-executable instructions, that when executed on one or more processors, causes the one or more processors to perform acts comprising:
- receiving a communication request to initiate a real-time communication session between an originating client device and a recipient client device, the communication request including a request for a Video over Long-Term Evolution (ViLTE) communication session;
- transmitting an additional request for domain information to the originating client device and the recipient client device;
- receiving an originating domain information from the originating client device and a recipient domain information from the recipient client device, based at least in part on the additional request for domain information;
- determining a network bandwidth limit for a client account associated with the originating client device;
- determining, using one or more rules, whether to establish the ViLTE communication session or a Voice over LTE communication session between the originating client device and the recipient client device, based at least in part on the originating domain information and the recipient domain information;
- establishing one of the ViLTE communication session or a VoLTE communication session between the originating client device and the recipient client device, based at least in part on the one or more rules; and
- in response to establishing the ViLTE communication session, modifying a bit-rate of a video component of the ViLTE communication session, based at least in part on the network bandwidth limit.

16. The one or more non-transitory computer-readable media of claim 15, wherein the originating domain information identifies a first geographic location of the originating client device at a point in time of initiating the real-time communication session, and the recipient domain information identifies a second geographic location of the recipient client device at the point in time of initiating the real-time communication session.

17. The one or more non-transitory computer-readable media of claim 15 further comprising:
- determining that a requisite network bandwidth for transmission of the video component of the ViLTE communication session is greater than the network bandwidth limit, and
- wherein, modifying the bit-rate of the video component of the ViLTE communication session is based at least in part on the requisite network bandwidth being greater than the network bandwidth limit.

18. The one or more non-transitory computer-readable media of claim 15, wherein the originating domain information and the recipient domain information includes at least one a Public Land Mobile network ID (PLMN ID) or a Mobile Station International Subscriber Directory Number (MSISDN), and wherein, the originating domain information and the recipient domain information is expressed as an online attribute value pair (AVP) code.

19. The one or more non-transitory computer-readable media of claim 15, further comprising:
- determining that a cooperative service agreement is in place with a telecommunications service provider associated with the recipient client device, based at least in part on the one or more rules, and
- wherein, establishing the ViLTE communication session is based at least in part on the cooperative service agreement being in place.

* * * * *